April 13, 1926.

C. E. GRIMM 1,580,597

ORNAMENTAL LAMP

Filed Oct. 3, 1925

INVENTOR.
CHARLES E. GRIMM
BY
Shigley & Harney
ATTORNEYS

Patented Apr. 13, 1926.

1,580,597

UNITED STATES PATENT OFFICE.

CHARLES E. GRIMM, OF COLUMBUS, OHIO.

ORNAMENTAL LAMP.

Application filed October 3, 1925. Serial No. 60,234.

*To all whom it may concern:*

Be it known that I, CHARLES E. GRIMM, a citizen of the United States of America, residing at Columbus, in the county of Franklin and State of Ohio, have invented certain new and useful Improvements in Ornamental Lamps, of which the following is a specification.

My present invention relates to improvements in ornamental lamps which, while capable of use in various different ways, are especially adapted for use in connection with automotive vehicles.

The lamps are designed for location on various parts of an automobile, as for instance on the radiator cap, mud guard, foot board, or other suitable place where the ornamental effect of the lamp will be appreciated by the spectator. A lamp according to my invention contemplates the use of a rotary, multi-colored device which is operated either by natural draft or by air currents created by the forward travel of the automobile or other vehicle upon which the lamp is used. Means are provided whereby the effect of multi-colored rings are produced from the rotation of the rotary member for the purpose of insuring a novel and attractive accessory for the automobile.

The invention consists in certain novel combinations and arrangements of parts involving a wind-actuated, rotary lamp as will be hereinafter more fully set forth and claimed.

In the accompanying drawings I have illustrated one complete example of the physical embodiment of my invention wherein the parts are combined and arranged according to the best mode I have thus far devised for the practical application of the principles of my invention.

While I have illustrated three colors, as red, white and blue for the lamp, it will be understood that the number of color effects may be changed, and various other colors may be used in the lamp if desired to produce different combinations of colors. The effect produced in the present instance, when the lamp is revolving, is that of three horizontally arranged rings of color, as red at the top, blue at the bottom and a white band intermediate these colors.

Figure 1:
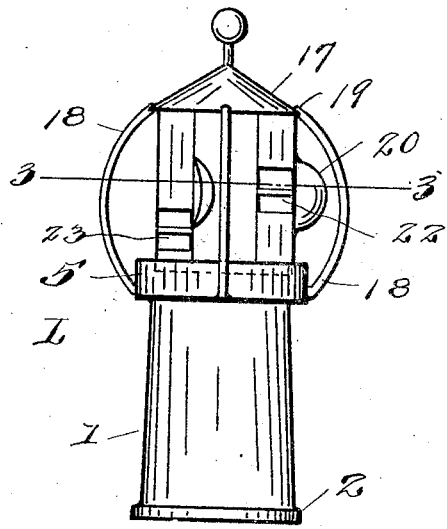
Figure 1 is a view in elevation of a lamp embodying the features of my invention and designed for a three-color illumination.
Figure 2:
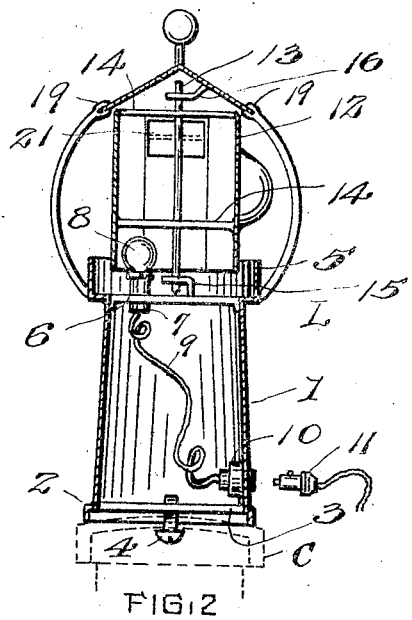
Figure 2 is a vertical sectional view of the lamp as applied to the radiator cap of an automobile which is shown in dotted lines.
Figure 3:
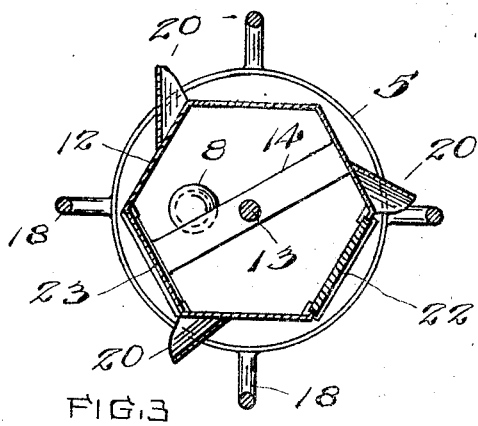
Figure 3 is a horizontal sectional view at line 3—3 of Figure 1.
Figure 6:
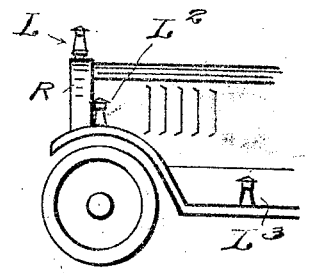
Figure 6 is a view showing a portion of an automobile wth the ornamental lamps located thereon at various places.

The lamp designated as a whole by the letter L is adapted for use at various locations on an automobile, as for instance on the cap C of the radiator R shown in dotted lines in Figure 2, or a lamp $L^2$ may be used on the mudguard, or a lamp $L^3$ used on the running board or foot board of the vehicle, as in Figure 6. In each instance the lamp is positioned in such manner that it is subjected to air currents created by the forward travel of the automobile, or to the force of natural drafts.

In carrying out my invention I preferably use a base or support as 1, in the form of a tubular tapered sleeve of metal having a lower annular flange 2 at its bottom end, which as illustrated in Figure 2 fits neatly over and in frictional contact with the top surface of the radiator cap C. In other positions illustrated the tubular base is supported upon a flat surface and secured to its supporting member in suitable manner. As best seen in Figure 2 the tubular base is fashioned with a lower horizontal cross arm 3 preferably cast integral therewith and centrally perforated for the reception of a screw 4 which is passed upwardly through the perforated radiator cap and threaded into the cross bar for rigidly holding the device to the cap.

At its upper end the tubular base is fashioned with an annular flange 5 to form an enlarged cup member, and another cross arm or bar 6 integral with the tubular casing or base is located at the junction of the cup with the base. The cross arm 6 is perforated to receive the socket 7 and support an electric lamp 8 to which the wires 9 lead from the socket 10 fixed in the side wall of the tubular base near its lower end. A detachable plug as 11 is adapted for use with the socket 10 in order that the electrical connections may be readily disjointed whenever it is necessary to remove the lamp or the radiator cap and its attached lamp.

Above the fixed tubular base is supported a rotary lamp housing 12 with its lower open end located within the cup 5 and enclosing the electric lamp 8. The lamp housing is provided with a spindle 13 rigid with the two upper and lower cross arms 14 and these arms are rigid with the housing. The spindle, which is located centrally of the housing and tubular base is supported to revolve in a lower bearing bracket 15 on the cross arm 6 (upon which arm the lower end of the spindle rests) and an upper bearing bracket 16 fixed at the inner side of a conical cap or cover 17 for the lamp.

The cap is supported in rigid manner at the upper ends of a suitable number of curved bars 18 rigid with and spaced about the periphery of the tubular base. At their upper ends these arms are bifurcated as indicated at 19 and the lower edge of the conical cap is snapped into these bifurcated ends and there frictionally engaged to retain the cap in rigid relation to the arms or bars 18 and the tubular base.

The bars 18 form protectors for the rotary lamp housing which revolves with its spindle in the bearing brackets 16 and 15, and this rotary movement of the housing and spindle is accomplished by impingement of air currents against a plurality of cup-shaped vanes 20, three of which are illustrated on alternate faces of the hexagonal shaped housing. The three faces bearing the vanes are imperforate and it will be apparent that the force of the air currents against the successively presented vanes will cause the housing and its spindle to turn anti-clockwise.

Figure 4:
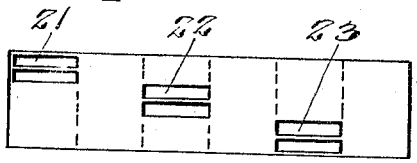
Figure 4 is a view illustrating the three-color lamp housing flattened out for convenience of illustration.
Figure 5:
Figure 5 is a diagrammatic view illustrating in conventional manner the red, white and blue colors.

The three faces of the hexagonal housing that alternate with the faces bearing the wings or vanes 20 are provided with windows or openings as 21, 22, and 23, which are filled with glass panels of red, white and blue respectively. In the development of the diagrammatic view in Figure 4 it will be seen that the windows are located at varying altitudes above the bottom of the housing and that these vari-colored windows revolve on the same axis but in different vertical planes. The result of this rotation of the single windows is the creation of the effect of three circular bands of various colors as indicated in Figure 5. When the lamp is illuminated at night the color effect is enhanced and the lamp presents a novel and attractive appearance for ornamental purposes.

The lamp 8 is concealed from view by means of the housing and the cup 5 and is protected with the interior of the housing by means of the conical cover 17. The windows may be filled by panels of glass or other suitable transparent material.

Having thus fully described my invention, what I claim as new and desire to secure by Letters Patent is—

The combination of a tubular base having an upper annular flange and attaching means at its lower end, of an elevated cover and supporting arms between said base and cover, a rotary, wind operated lamp housing having its lower end within said flange and its upper end within said cover, a spindle secured to the housing having bearings in said base and cover, a lamp within the housing, and circumferentially spaced windows in said housing located at varying planes along the longitudinal axis of the housing.

In testimony whereof I have affixed my signature.

CHARLES E. GRIMM.